April 30, 1935.  A. H. BINCH  1,999,923
MACHINE FOR FORMING BENT WIRE CLIPS OR RINGS
Filed Aug. 17, 1934   3 Sheets-Sheet 1

INVENTOR
Arthur H. Binch,
BY
Barker Collings
ATTORNEY

April 30, 1935. A. H. BINCH 1,999,923

MACHINE FOR FORMING BENT WIRE CLIPS OR RINGS

Filed Aug. 17, 1934 3 Sheets-Sheet 2

INVENTOR
Arthur H. Binch,
BY
Barker & Collings
ATTORNEYS

April 30, 1935.   A. H. BINCH   1,999,923
MACHINE FOR FORMING BENT WIRE CLIPS OR RINGS
Filed Aug. 17, 1934   3 Sheets-Sheet 3

INVENTOR
Arthur H. Binch,
BY
Barker & Collings
ATTORNEYS

Patented Apr. 30, 1935

1,999,923

UNITED STATES PATENT OFFICE 1,999,923

MACHINE FOR FORMING BENT WIRE CLIPS OR RINGS

Arthur Henry Binch, Lowdham, England, assignor to William Rhodes Limited, Leeds, Yorkshire, England Application August 17, 1934, Serial No. 740,302 In Great Britain November 12, 1932

9 Claims. (Cl. 140—3)

This invention is for an improved machine for forming bent wire clips, rings or the like, and particularly relates to a machine for use in the manufacture of spring upholstery, such as pocketed or other spring mattresses.

The present invention, according to one aspect thereof, provides a machine for forming bent wire clips, rings, or the like, particularly a machine for use in the manufacture of spring mattresses, comprising a movable saddle member, feeding means for feeding the end of a length of wire stock across the saddle member, a movable pair of bending jaws, a movable wire-cutting element (preferably constituted by an edge on one of the jaws), means for advancing the element and the jaws towards the saddle member to cut from the stock a length of wire to form a clip and to force the two ends of the severed length of wire down around the saddle member into substantially U-shape, means for withdrawing the saddle-member from between the jaws, and means for moving the jaws together to grip the U between them and thereby to close it into ring-like or diamond form.

The machine according to the present invention is particularly intended for fastening together adjacent coil springs in upholstery, especially spring mattresses in which the compression springs are located in individual canvas or other fabric pockets and which are termed "pocketed spring mattresses". Such mattresses are usually made as follows. Open-ended pockets are formed in strips of canvas or other fabric, and into each pocket a coil spring compressed by hand until it is nearly flat is inserted. The open ends are then closed by sewing and each spring is turned through 90° within its closed pocket so that the seams formed by said sewing extend substantially diametrically across one end of the springs. The resultant product is a chain of approximately cylindrical pockets each containing a coil spring, the axes of the spring being parallel, and a number of such chains are used side by side in what are known as pocketed spring mattresses, the canvas of contiguous chains being connected by some form of stitching.

In order to bring a clip formed by this machine around the coils of adjacent springs, notwithstanding the fabric covering, it is desirable that the jaws shall be movable longitudinally or downwardly prior to the said closing movement and carry the U-shaped clip with them. Thus for example two springs of a mattress or the like may be located beneath the machine so that by this downward movement the partly-formed clip is brought to embrace contiguous portions of the upper coil of each spring and is then closed so that the two springs are directly connected together. If the mattress is a pocketed spring mattress then the same downward movement forces the partly-formed and U-shaped clip through the canvas or other fabric of the pockets. The closing movement may actually be accompanied by longitudinal movement of the jaws.

In order that the invention may be better understood reference will now be made to the accompanying drawings, in which Figures 1 and 2 are respectively front and side elevations of a machine according to this invention, for producing wire clips.

Figure 9 is a detail, upon an enlarged scale of wire-feeding mechanism shown in Figure 1, while

Throughout this description like reference numerals indicate like parts.

Figure 1:
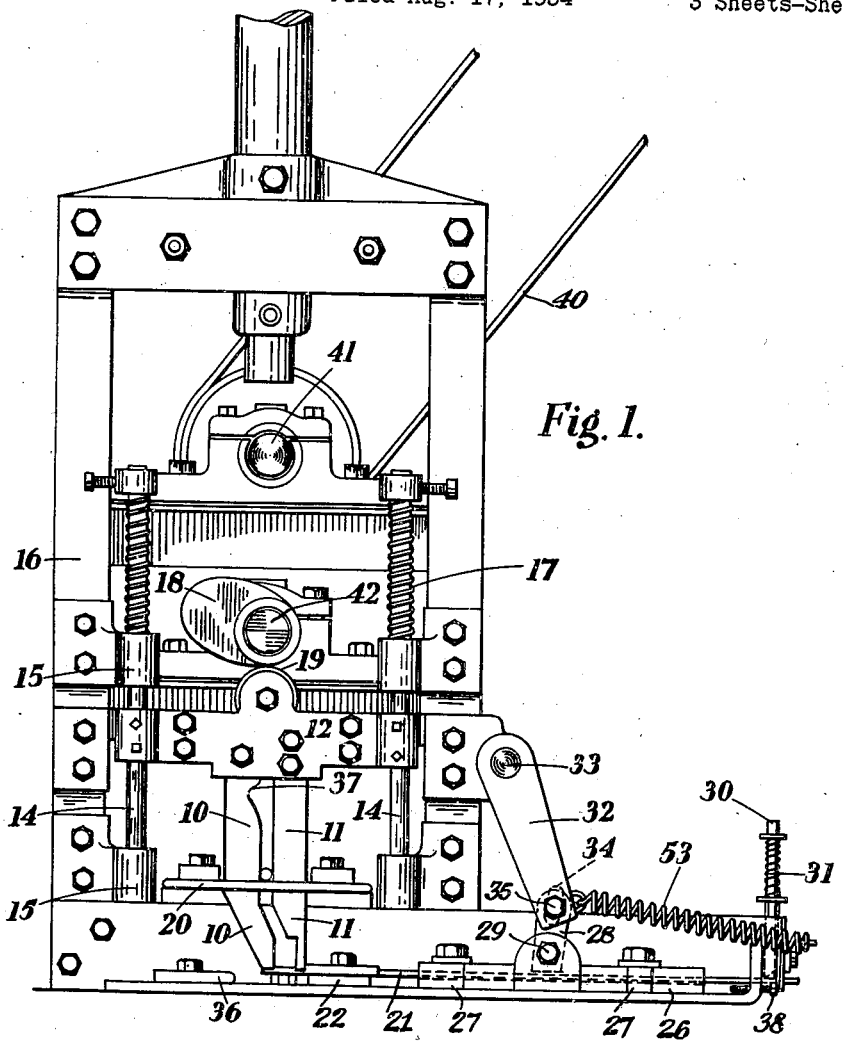

The machine illustrated is provided with two wire-bending jaws 10 and 11 which hang from a vertically movable cross-head 12, and with a saddle-member 13 which is movable horizontally into and out of a position in which it lies between the two jaws.

The cross head from which the two jaws depend is preferably mounted upon two uprights 14 which extend slidably through bosses 15 attached to the main frame 16 of the machine and is forced downward against the action of compression springs 17 by mechanism such as a cam or eccentric 18 which acts on a ball-bearing cam follower 19 in the cross head 12. One (11) of the jaws which serves also as a wire cutter is rigidly mounted on the cross head 12, and the other jaw 10 is pivotally mounted in the cross head to permit of a closing movement. These jaws extend downwards through guides 20 towards the saddle-member.

Figure 3:
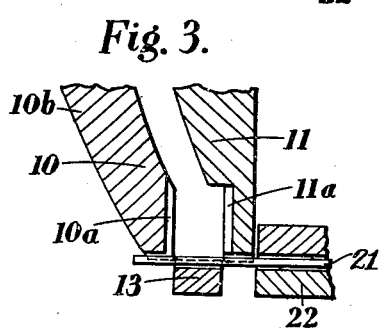
Figures 3–6 show successive stages in the manufacture of a clip.
Figure 4:
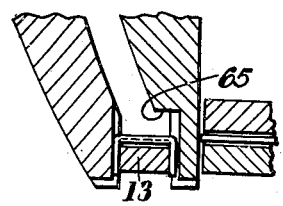

In the operation of the machine a length of wire 21 is fed forward through a channel in a rest 22 so that it rests on the saddle member 13 with its front end below the pivoted jaw 10 as is shown in Figure 3. The two jaws are lowered (during which movement the second or rigid jaw 11 cooperates with the rest 22 to cut off the desired length of wire) so that they bend the severed piece of wire into a U-shape over the saddle-member (Fig. 4). The latter is then withdrawn (Fig. 5), and the jaws continue to descend and at the same time are caused to move together so that the top bar of the U is bent approximately at its mid-length to bring the ends together and form a diamond-shaped clip (Fig. 6), and it will be appreciated that if a mattress is positioned with the contiguous parts of the top coils of adjacent springs beneath the jaws, this downward movement causes the U-shaped clip to engage over these two coils so that when the clip is closed said coils are fastened together.

Figure 5:
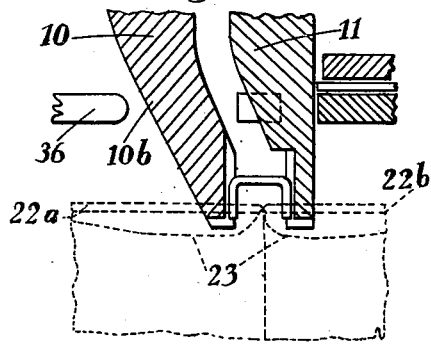
Figure 6:
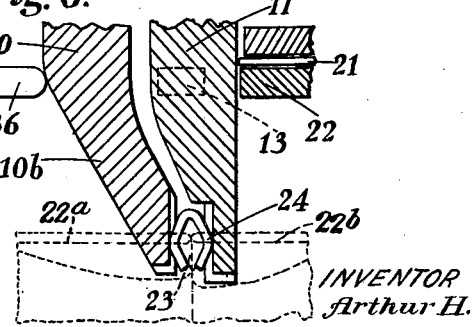
Figure 7:
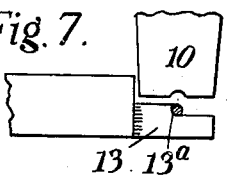
Figure 7 is a detail of the machine, upon an enlarged scale.

This is illustrated in Figures 5 and 6, in which figures the top coils of springs in adjacent chains of springs are shown by dotted lines at 22a and 22b. It will be seen that as the jaws 10 and 11 descend they force the canvas or fabric, in which the springs are enclosed, downwards within the top coils, as is indicated by a dotted line at 23, so that the diamond shaped clip 24 when closed not only embraces the top coils 22a and 22b but pinches the canvas of adjacent pockets between its closed ends. These closed ends of the clips may or may not penetrate the fabric according to the nature thereof.

Figure 9:
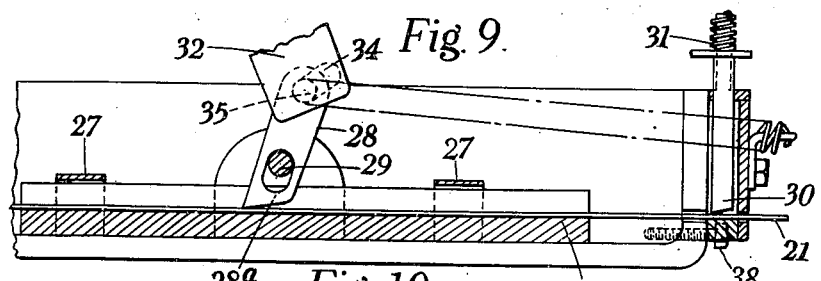

The wire stock is fed forward in the following manner. The wire passes towards the jaws through a friction device, the purpose of which is hereinafter explained, through feed mechanism shown in detail in Figure 9, and through the rest 22 the front end of which is in proximity to the cutting jaw 11 and cooperates with the latter to shear off the requisite length of wire as hereinbefore described. This feed mechanism is arranged to grip the wire, to move forward to feed the wire to the jaws, and then to release it and move back to its initial position, and may conveniently have the following construction. There is a block 26 which is slidable in suitable guides 27 towards and away from the jaws 10, 11, and is formed with a groove in which the wire 21 lies, and immediately above this groove an upright lever 28 is pivoted at 29, in the block, the lower end of which lever is formed with a cam face 28a so that if the top end of the lever is rocked towards the jaws the said cam-like lower end engages the wire and clamps it firmly against the block. Any further effort exerted on the top end of the lever now moves the sliding block 26 and the wire 21 towards the jaws, so that the wire is fed forward positively. At the termination of the forward feeding movement the top end of the lever 28 is rocked in the reverse direction, and, as the friction device (which may be of any convenient construction, but preferably comprises a chisel-edged plunger 30 which is forced down onto the wire by means of a spring 31, and preferably incorporates a screw adjustment) holds the wire against movement away from the jaws, the effect of this reverse movement of the lever is first to release the wire and then to slide or retire the block 26 backwards to its initial position. These rocking movements are imparted to the lever 28 by mechanism which may conveniently comprise a further lever 32, mounted on a horizontal rocking shaft 33 and having at its bottom end either a pin 35 which engages in a slot 34 on the lever 28 (as shown in Fig. 1), or a slot 34 in which such a pin 35 on the lever 28 engages, as shown in Fig. 9 and the stroke of the feed mechanism is such that the wire is fed forward through the requisite definite distance at each operation of it. Conveniently, screw-means are provided for adjusting the amount by which the wire is fed forward, such for example as the screw 38 limiting the retiring or reverse movement of the block 26.

By this feeding movement the front end of the wire stock 21 is fed forward across the saddle-member 13 and in front of a raised guide ledge 13a at the rear thereof until it lies beneath the inner face of the pivoted jaw 10, and because the saddle-member is narrower than the gap between the jaws the wire overlaps said member 13 at each side. The jaws 10, 11, now descend and the cutting jaw 11 in its descent shears off the requisite length of wire to make one clip. Further movement of the jaws serve to bend the overlapping ends of the severed piece of wire over the edges of the saddle member until it conforms to an inverted U-shape, the inner faces of the two jaws being provided with vertical grooves 10a and 11a to accommodate the arms of the U. At this stage, a stop 65 projecting from the inner face of the fixed jaw 11 rests on top of the cross bar of the U. The saddle member 13 is then withdrawn and the jaws descend further and in their descent a suitably curved or inclined face 10b on the lower end of the pivoted jaw 10 comes against an abutment 36 which serves to force that jaw in towards the cutting jaw, means being provided for adjusting this abutment towards and away from the jaws and for locking it firmly in the desired position. The pivoted jaw 10, which extends through the guide 20, is prevented from moving towards the fixed jaw 11 during the major portion of the downward movement, but in order that it may swing towards the other jaw at the appropriate moment said jaw 10 is recessed as at 37. The continued downward movement of the jaws therefore serves to lower the inverted U into a position in which it straddles adjacent parts of the coils 22a and 22b which are to be connected together and, because of the movement of the jaws towards each other, to bend the crossbar of the U at approximately the centre of its length so that the two ends of the U are brought together and a substantially diamond-shaped clip or ring thus formed which connects the coils.

Figure 10:
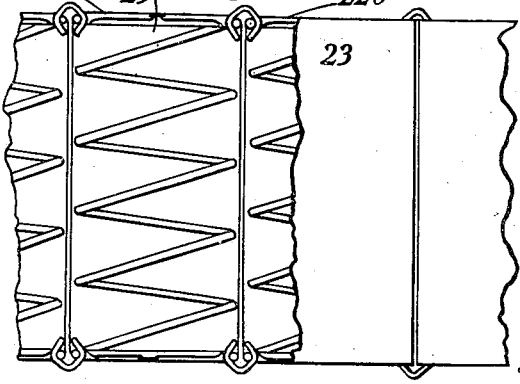
Figure 10 is a sectional view of a portion of a pocketed spring mattress in which the upper coils of springs in adjacent chains are directly connected together in the manner provided by this invention.

A view of a portion of a pocketed spring mattress, with the fabric covering partly broken away to expose several of the springs and wherein the contiguous portions of springs in adjacent "chains" of springs, are fastened together in this manner is shown in Figure 10.

Figure 2:
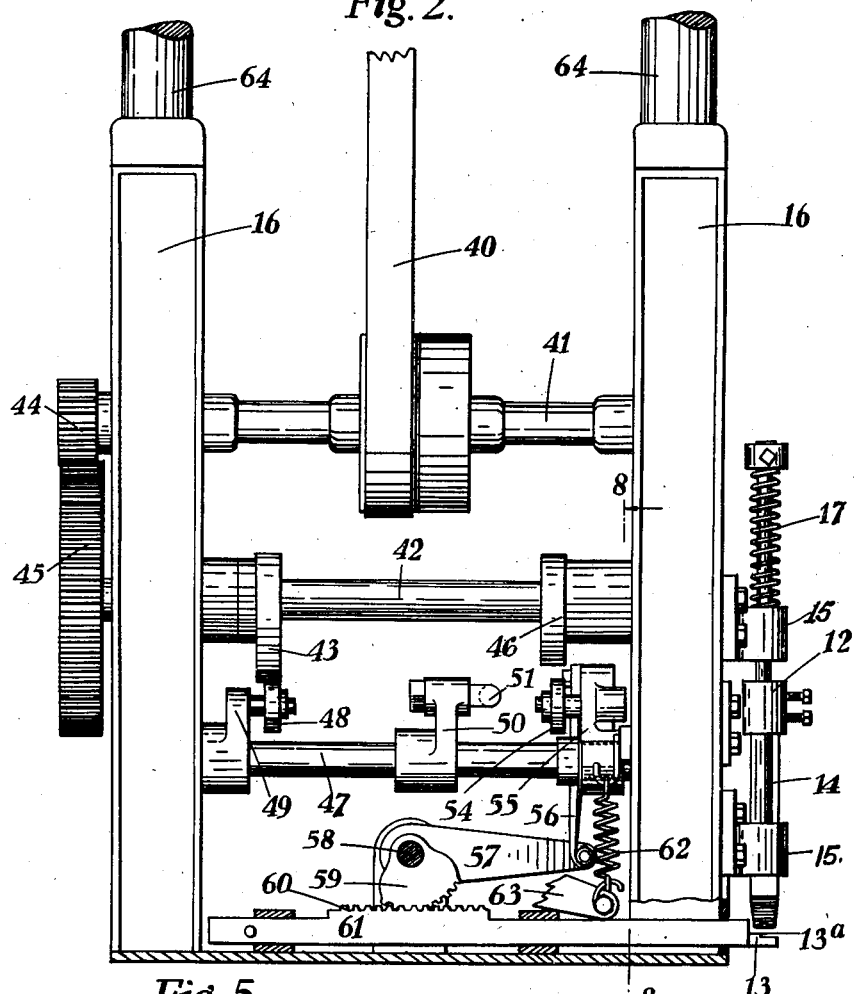
Figure 8:
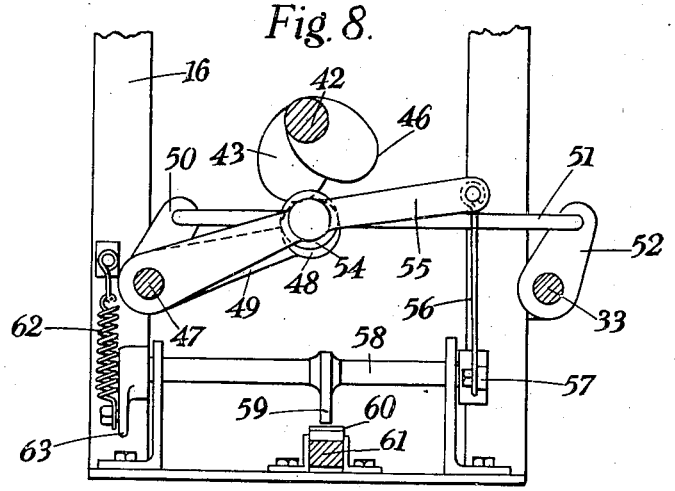
Figure 8 is a sectional elevation, taken upon the line 8—8 in Figure 2.

It will of course be understood that the feed-lever 32 and the cam or eccentric 18 by which the jaws 10, 11, are forced down are driven in timed relation by power means. The machine illustrated is driven by means of a belt 40 running over fast and loose pulleys on a shaft 41 from which a second shaft 42, carrying the cam 18, is driven through reduction gears 44, 45. In addition to the cam 18, the said shaft 42 also carries cams 43 and 46 which respectively serve to rock a third shaft 47 from which the wire feed movement is derived and lever 55 controlling the movements of the saddle 13. Of these two cams, that which is numbered 43 in Fig. 2 cooperates with a follower 48 on an arm 49 attached to the shaft 47, thereby imparting to said shaft 47 rocking movements which are communicated by means of an arm 50, push and pull rod 51, and arm 52, to that shaft 33 (Figs. 1 and 8) to which the feed lever 32 is attached, it being noted that said lever 32 is biased in one direction by a spring 53. The other cam 46 is engaged by a follower 54 upon an arm 55, which arm is rotatably mounted upon the shaft 47 and at its free end is connected by a substantially upright rod 56 to the free end of an arm 57. The latter is attached to a horizontal shaft 58, the axis of which is at right angles to the axis of the shaft 47, and as this shaft 58 carries a quadrant 59 meshing with a rack 60 cut upon the slider 61 upon which the saddle 13 is carried, it will readily be seen that the saddle 13 may be moved horizontally at intervals. The follower 54 is drawn towards its cam 46, by means of a spring 62 which extends between a hook on the frame 16 and the end of an arm 63 also attached to the quadrant shaft 58.

As the mattress or the like to be operated upon has to be traversed beneath the jaws 10, 11, and the saddle 13 the machine is preferably suspended by means of the pillars 64, and if desired there may be a table (not shown) for supporting the mattress.

It will readily be appreciated that the machine hereinbefore described is particularly suitable for use in the manufacture of spring upholstery and enables the springs incorporated therein to be directly attached one to the other in a novel and expeditious manner.

We claim:—

1. A machine for forming bent wire clips, rings or the like, particularly a machine for use in the manufacture of spring mattresses, comprising a movable saddle member means for moving the saddle member into operative position, feeding means for feeding the end of a length of wire stock across the saddle member while in said position, a movable pair of bending jaws, a wire-cutting element, means for advancing the element and the jaws towards the saddle member to cut from the stock a length of wire to form a clip and to force the two ends of the severed length of wire down around the saddle member into substantially U-shape, means for withdrawing the saddle-member from between the jaws and means for moving the jaws together to grip the U between them and thereby to close it into ring-like or diamond form.

2. A machine for forming bent wire clips, rings, or the like, particularly a machine for use in the manufacture of spring mattresses, comprising a movable saddle member, feeding means for feeding the end of a length of wire stock across the saddle member, a movable pair of bending jaws, a wire-cutting element movable with them, means for advancing the element and the jaws in unison towards the saddle member first to cut from the stock a length of wire to form a clip and then to force the two ends of the severed length of wire down around the saddle member into substantially U-shape, means for withdrawing the saddle member from between the jaws and means for moving the jaws together to grip the U between them and thereby to close it into ring-like or diamond form.

3. A machine for forming bent wire clips, rings, or the like, particularly for use in the manufacture of spring mattresses, comprising a saddle member, means for supplying an appropriate length of wire across it, a movable pair of bending jaws whereof one jaw is capable only of longitudinal movement and is formed as one member of a wire shearing device and the other jaw is capable both of longitudinal movement and of closing movement towards the first jaw, a part over which the wire extends towards the saddle-member which part constitutes the other member of the shearing device, means for advancing the jaws one on each side of the saddle-member to cut off the required piece of wire and to bend this wire into U-shape over the said member, means for disengaging the saddle-member from the U-shaped wire, and means for moving the jaws longitudinally and causing them to grip the U to close its ends during such movement.

4. The machine claimed in claim 1, combined with an abutment, an inclined face on one of the jaws, and means for moving the jaws longitudinally with the U between them to bring said inclined face in contact with the abutment whereby the two jaws are forced together.

5. A wire clip-forming and -closing machine, comprising an anvil movable between operative and inoperative positions, means for so moving it, a movable pair of bending jaws, a wire cutting element, means operating while the anvil is in operative position for (1) feeding the end of wire stock across the anvil, (2) moving the cutting element to sever an appropriate length of the wire and (3) advancing the jaws on each side of the anvil to bend the two ends of the severed wire across it into U-form, means for moving the anvil to its inoperative position, leaving the wire in the jaws, means for moving the jaws longitudinally and for causing them to squeeze the wire into a ring.

6. A wire clip-forming machine, comprising a movable pair of bending jaws formed each with a wire-receiving groove across its end face, an anvil, means for feeding the end of a stock of wire across said anvil, means for moving the jaws in relation to the anvil until the wire thereon is received and located by the said grooves, a cutting element, means for operating said element to sever from the stock that end of the wire that is held between the anvil and the ends of the jaws, means for moving the jaws in relation to the anvil to bend the ends of the severed piece of wire about said anvil, means for disengaging the anvil from the bent wire, leaving the latter in the jaws, and means for causing the jaws to grip the wire and close it into a ring.

7. A machine for forming bent wire clips or rings, particularly in the manufacture of spring mattresses, comprising a saddle, means for feeding the end of a length of wire stock across it, a pair of movable bending jaws, a wire-cutting element on one of them, a cutter cooperating with said element, means for moving said jaws and element towards the saddle to sever from the stock the piece of wire that extends across it and to bend the ends of this severed piece about the saddle, means for disengaging the saddle therefrom, and means for subsequently moving the jaws together to close the bent wire into a ring.

8. A machine for forming bent wire clips, rings, or the like, particularly for use in the manufacture of spring mattresses, comprising a saddle member, a reciprocable block over which wire passes to the jaws, a lever pivoted to said block intermediate of its ends which lever has a wire-engaging end adjacent the block formed like a cam in such manner that upon movement of the other ends of the lever towards the jaws the wire is gripped between said cam and the block and is moved by them, and upon movement of said other end in the reverse direction the wire is released, means for moving said lever whereby the block is reciprocated and the wire alternately gripped to feed an appropriate length across the saddle member and released, a movable pair of bending jaws, means for advancing said jaws one on each side of the saddle member to force the two ends of the wire down around it into U-shape, means for disengaging the wire from the saddle member, means for moving said jaws longitudinally carrying the U-shaped wire between them, and means for causing them to move together to close the said wire into a ring.

9. A machine for forming bent wire clips, rings, or the like, particularly for use in the manufacture of spring mattresses, comprising a saddle member, a reciprocatable block over which the wire passes to the saddle-member, a lever pivoted to said block intermediate of its ends and having a wire-engaging end shaped like a cam for gripping the wire between said end and block upon movement of the other end of the lever towards the saddle-member and for releasing said wire upon movement of said other end in the reverse direction, means for reciprocating the block towards and away from the saddle-member and for rocking the lever as aforesaid to grip and release the wire alternately in feeding it to the saddle-member, means for adjustably determining the stroke of the block, a movable pair of bending jaws, means for advancing said jaws one on each side of the saddle-member to force the two ends of the wire down around it into U-shape, means for disengaging the wire from the saddle member, means for moving said jaws longitudinally carrying the U-shaped wire between them, and means for causing them to close together to close the said wire into a ring.

ARTHUR HENRY BINCH.